Jan. 6, 1931.   C. C. BRENNER   1,787,612
COIL WINDER
Filed July 11, 1928
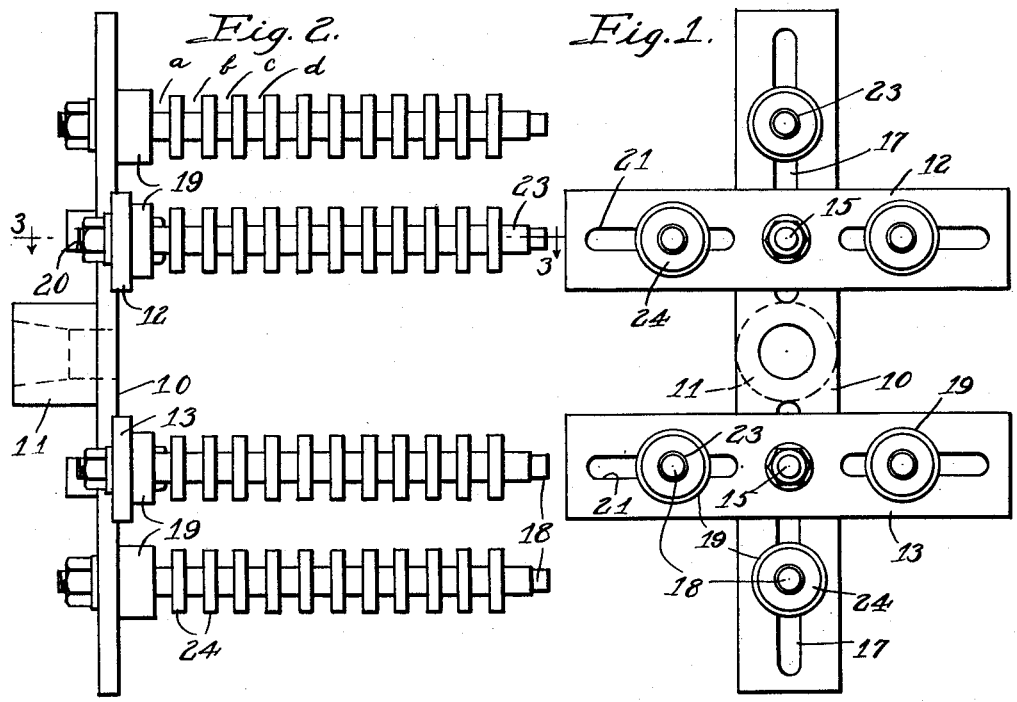
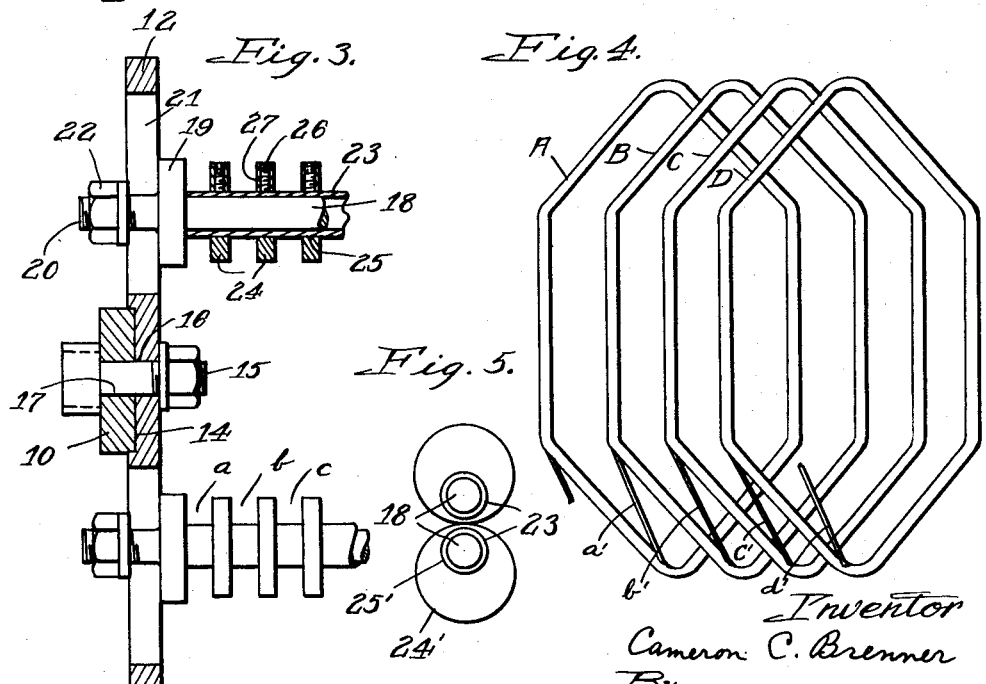
Inventor
Cameron C. Brenner
By Wilson & McCanna
Attys.

Patented Jan. 6, 1931

1,787,612

UNITED STATES PATENT OFFICE

CAMERON C. BRENNER, OF ROCHELLE, ILLINOIS, ASSIGNOR OF ONE-HALF TO HERBERT S. BAIN, OF ROCHELLE, ILLINOIS

COIL WINDER

Application filed July 11, 1928. Serial No. 291,883.

This invention relates to a coil winder especially designed and adapted for use in electrical repair shops for the winding of coils for dynamo-electric machines generally, the principal feature of adaptability for the purpose mentioned being the fact that the device may be adjusted to suit the requirements of practically any job which may be encountered and, furthermore, is adapted to wind a large number of coils in one set-up so that as many coils as may be required may easily be wound in one, two, or more, sets, depending, of course, on the size of the job to be handled.

In the past, it was customary to wind coils one at a time on a frame or former. These frames either had to be made up specially for each job or else a whole set of them had to be kept on hand to accommodate practically any kind of job. Upon completing a coil on one of the frames the side plates bolted thereon had to be removed to permit the removal of the coil and then had to be replaced for the winding of the next coil, and so on, depending on the number of coils required. The winding of the coils, therefore, consumed much more expense than appears to be warranted by what should be a mere incidental phase of the work, either in the repairing or the building of a dynamo-electric machine. I am aware that coil winders have more recently been devised and patented which afford adjustability to permit the winding of coils of various sizes and shapes, but these devices have invariably been of complicated and expensive construction, impractical for the use contemplated, and have not been widely adopted. They in no way facilitated the winding operation itself but still made it necessary to wind one coil at a time.

The device made in accordance with my invention comprises an expansible frame adapted to be mounted on the head stock-spindle of a lathe or any means for turning the same, the frame having coil winding posts extending therefrom parallel to one another and arranged to be adjusted toward or away from one another according to the size and shape of coils to be wound. The posts are made up of sleeves having a telescoping fit on mandrels, permitting the removal thereof and replacement with ease and facility, the sleeves having collars adjustably secured thereon in spaced relation, these collars being arranged to be set according to the number of turns of wire to be wound in each coil. It is not uncommon to provide ten, twelve, or more of these collars on each sleeve for the winding of a corresponding number of coils, all in one set-up so that a motor requiring, for example, twenty four or thirty coils can easily be taken care of in the winding of two sets of coils. As soon as a set of coils has been wound they can be removed by simply slipping the sleeves off the mandrels and another set can then be wound as soon as the sleeves have been replaced. All of the coils needed can be wound in a small fraction of the amount of time otherwise consumed in doing this work. Furthermore, as will presently appear, when the coils are wound on this device in multiple, all of the coils are interconnected and that many soldering operations are dispensed with when the coils are ultimately inserted in their slots, and hence the cost of the work is brought still lower, and the work is, furthermore, of a higher grade and more uniform and dependable character.

The invention is illustrated in the accompanying drawing, in which—

Figure 1 is a front view of a coil winder embodying my invention;

Fig. 2 is a side view of Fig. 1;

Fig. 3 is a cross-section on a slightly enlarged scale taken on the line 3—3 of Fig. 2;

Fig. 4 is a view of a set of coils produced on the device showing how the same are connected as a result of the fact that all of the coils are wound from one length of wire, the wire being led from the end of one coil to the beginning of the next, and so on; and Fig. 5 is an isolated end view of two mandrels showing the use of a modified form of collars, the collars having eccentric holes therein for the purpose of permitting the mandrels to be brought closer together than could otherwise be done, as required, for example, in the winding of very small coils.

The same reference numerals are applied to corresponding parts throughout the views.

The device comprises an expansible frame including a longitudinal member 10 fixed to or integral with a head 11 arranged to be mounted on the head stock spindle of a lathe for the turning of the frame by power in the winding of the coils, although, of course, the frame might be turned by hand if so desired. Cross-members 12 and 13 are suitably milled on the backs thereof, as shown at 14, (see Fig. 3) to seat on the longitudinal member 10 and be held against turning with respect thereto while permitting adjustment of the members lengthwise of the member 10. Bolts 15 received in holes 16 in the cross-members pass through slots 17 extending lengthwise of the longitudinal member 10 and are arranged, when tightened, to clamp the cross-members in any position of adjustment. The cross-members 12 and 13 are, therefore, adjustable toward and away from one another while maintaining strict parallelism. Mandrels 18 forming parts of the coil winding posts have annular flanges 19 provided near the threaded end 20 thereof and are mounted for adjustment toward and away from one another in the slots 17 and slots 21 provided in the cross-members 12 and 13 and are arranged to be fastened in any adjusted position by the tightening of nuts 22 received on the threaded ends 20 of said mandrels. The flanges 19 on the mandrels received in the slots 17, as appears in Fig. 2, are somewhat thicker than those provided on the mandrels received in the slots 21 in order that the faces of all of these flanges will lie substantially in a common plane when the cross-members are bolted in adjusted position and the nuts on the threaded ends of all of the mandrels have been tightened with the mandrels disposed in proper adjusted position. The purpose in this is to properly correlate the ends of a plurality of sleeves 23 having a telescoping fit on the mandrels 18, the said sleeves being arranged to be slipped over the mandrels and brought into engagement with the flanges 19. Collars 24 having center holes 25 enabling the same to be slipped onto the sleeves 23, are arranged to be secured in position thereon by means of set screws 26 threadedly received in radial holes 27 provided in said collars. The collars are arranged to be set in substantially uniformly spaced relation to one another, the end collar of a set on any certain sleeve being spaced from the end of the sleeve the same distance as from the second collar so that the first coil of a set can be wound in the space between the flanges 19 and the first collars, the second in the space between the first collars and the second collars, and so on, the same space being allotted each coil.

In operation, the cross-members 12 and 13 are adjusted toward or away from one another for the proper longitudinal spacing of the mandrels 18 received in the slots 21 thereof, the latter being arranged to be adjusted thereafter for the proper transverse spacing. The mandrels received in the slots 17 are also arranged to be adjusted to the desired positions. Then, assuming that the collars 24 have all been set in proper spaced relation on the sleeves 23 and that the latter have been slipped onto the mandrels and are disposed in engagement with the flanges 19 of the latter, the device is ready for operation and can be used for the winding of as many coils as there are collars on any one of the sleeves. A counter of any suitable form may be used to facilitate the matter of counting the number of turns put into each coil. Referring to Fig. 4, it will be seen that upon the completion of coil A in the first space, designated $a$ in Figs. 2 and 3, the wire may be led to the next space $b$, as represented at $a'$ in Fig. 4, whereupon coil B can then be wound, and so forth, for coils C, D, etc. It will thus appear that the coils are all wound from a single length of wire and are connected, as represented at $a'$, $b'$, $c'$, $d'$, etc., the wire being led in each case from the end of one coil to the beginning of the next. The saving in time which results with this method of winding coils, as compared with the old method, is believed to be self-evident. The fact, too, that all of the coils are interconnected and there is, therefore, no necessity for soldered connections is also an important factor both from the standpoint of time saving and improving the character and quality of the work. The moment one set of coils has been wound all of the sleeves 23 can be slipped off the mandrels to remove the coils therefrom and can then be replaced for the winding of the next set of coils. There is nothing that has to be unfastened, so that no tools are needed in the operation of stripping off coils. All of the sleeves can easily be taken off and replaced in less time than was otherwise taken to remove and replace the side plates on the old style one-coil frame or former.

When a device similar to that shown and described is made on a smaller scale to take care of the winding of much smaller coils, in which case the mandrels 18 frequently have to be brought in very close proximity, as shown in Fig. 5, it becomes necessary to provide collars 24', the holes 25' in which are eccentric. These collars are arranged to be slipped onto the sleeves 23 and fastened similarly as the collars 24 and are arranged to be so disposed that the portions thereof of smallest section are disposed in juxtaposition, thereby permitting much closer positioning of the mandrels 18 with collars of a given diameter than could be gotten using collars of the same diameter having center holes therein. In other words, the size of the collars does not impose as much of a restriction on the extent to which the device may be adjusted down to wind small sized coils.

I claim:

1. A coil winder comprising, in combination, a frame, a plurality of mandrels projecting from said frame, and a sleeve having a telescoping fit on each of said mandrels to permit removal and replacement thereof, each of said sleeves having means thereon providing a plurality of separate coil winding recesses.

2. A coil winder comprising, in combination, a frame, a plurality of mandrels projecting from said frame in spaced and substantially parallel relation to one another, sleeves having a telescoping fit on said mandrels permitting the easy and quick application and removal thereof, and collars slidably received on said sleeves and having means for securing the same in adjusted spaced relation thereon whereby to define a plurality of coil winding recesses therebetween.

3. A device as set forth in claim 2 wherein the collars have eccentric holes therein for the reception of said sleeves substantially as and for the purposes described.

4. A coil winder comprising, in combination, a frame including a longitudinal member and one or more transverse members mounted thereon, mandrels each having one end flanged and threaded, the members of said frame having slots provided therein for the reception of the ends of said mandrels, said mandrels having nuts threading on the threaded ends thereof for securing the same in adjusted position in said slots, the outside faces of all of the flanges of said mandrels being disposed substantially in a single plane, sleeves having a telescoping fit on said mandrels and arranged to have the ends thereof brought into engagement with said flanges, and means on said sleeves providing a plurality of coil winding recesses on each sleeve.

5. A device as set forth in claim 4 wherein the last mentioned means comprises collars having a telescoping fit on said sleeves permitting the adjustment of said collars with respect to one another to different spaced relation, each of said collars having means for securing the same in adjusted position on its sleeve.

6. In a coil winder, the combination of a frame adapted to be rotated, a plurality of mandrels projecting from said frame in spaced and substantially parallel relation to one another and preferably adjustable on the frame with reference to one another, and tubular coil winding members received on said mandrels, and all provided with coil winding recesses of approximately the same size, the recesses on adjoining members being disposed approximately in the same plane whereby to permit the winding of coils each spanning one particular series of recesses, a series of coils being arranged to be wound on the members in one set-up and all from one continuous length of wire so that a length of extra wire intervenes between the end of one coil and the beginning of the next coil and so on.

7. In a coil winder, the combination of a frame adapted to be rotated, and a plurality of coil winding posts projecting from said frame in substantially parallel relation to one another and adjustable relative to the frame toward or away from one another and all provided with coil winding recesses of approximately the same size, the recesses on adjoining posts being disposed approximately in the same plane whereby to permit the winding of coils each spanning one particular series of recesses, a series of coils being arranged to be wound on the posts in one set-up and all from one continuous length of wire so that a length of extra wire intervenes between the end of one coil and the beginning of the next coil, and so on.

8. A coil winder comprising, in combination, a frame including a longitudinal member and one or more transverse members mounted thereon, mandrels each having one end flanged and threaded, the members of said frame having slots provided therein for the reception of the ends of said mandrels, said mandrels having nuts threading on the threaded ends thereof for securing the same in adjusted position in said slots, the outside faces of all of the flanges of said mandrels being disposed substantially in a single plane, and a plurality of collars carried on each of the mandrels in substantially equally spaced relation to one another, the spacing of the endmost collars with reference to the flanges being the same as the spacing of the collars with reference to one another, whereby to provide a plurality of coil winding recesses on each mandrel of substantially uniform width.

9. A coil winder comprising, in combination, a frame including a longitudinal member and one or more transverse members mounted thereon, mandrels each having one end flanged and threaded, the members of said frame having slots provided therein for the reception of the ends of said mandrels, said mandrels having nuts threading on the threaded ends thereof for securing the same in adjusted position in said slots, the outside faces of all of the flanges of said mandrels being disposed substantially in a single plane, and a plurality of annular projections on said mandrels in substantially equally spaced relation to one another, the endmost projections being spaced from the flanges a distance equal to the spacing of the projections with reference to one another whereby to provide a plurality of coil winding recesses on said mandrels of substantially uniform width.

10. In a coil winder, the combination of a frame adapted to be rotated, and a plurality of coil winding posts projecting from said frame in substantially parallel relation to one another and adjustable relative to the frame toward or away from one another and all provided with coil winding recesses, the recesses on adjoining posts being disposed approximately in the same plane whereby to permit the winding of coils each spanning one particular series of recesses.

11. A coil winder comprising, in combination, a frame, a plurality of mandrels projecting from said frame in spaced and substantially parallel relation to one another, and collars carried on said mandrels and arranged to be secured thereon in any desired spaced relation, said collars providing therebetween a plurality of separated coil winding recesses.

12. A coil winder comprising, in combination, a frame, and a plurality of coil winding posts comprising mandrels mounted on said frame for adjustment toward and away from one another, said mandrels having means arranged for holding the same in adjusted coil winding position, and a plurality of collars mounted on said mandrels in spaced relation and for easy removal and providing therebetween a plurality of coil winding recesses, the removal of said collars resulting in the removal of all of the coils wound thereon in one set-up, the said coils being all interconnected.

In witness of the foregoing I affix my signature.

CAMERON C. BRENNER.